United States Patent
McCrossin et al.

(10) Patent No.: US 6,600,840 B1
(45) Date of Patent: *Jul. 29, 2003

(54) IMAGE FORMAT CONVERSION SUCH AS PHOTOMETRIC, ROTATION, CROPPING, PADDING, SCALING, DITHERING, BIT PADDING, GRAYSCALE AND COLOR TRANSFORMATION, ENCODING AND DECODING USING A PLURALITY OF FILTERS

(75) Inventors: James M. McCrossin, San Jose, CA (US); Charles Vincent Rossi, San Jose, CA (US); Carol H. Thompson, San Jose, CA (US)

(73) Assignee: International Business Machines Corporation, Armonk, NY (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 1238 days.

(21) Appl. No.: 08/897,401

(22) Filed: Jul. 21, 1997

Related U.S. Application Data

(63) Continuation of application No. 08/304,726, filed on Sep. 12, 1994, now abandoned.

(51) Int. Cl.[7] .............................. G06K 9/54; G06K 9/60
(52) U.S. Cl. ...................... 382/302; 382/261; 382/162; 382/296; 382/298; 382/232; 382/282; 345/596; 345/649; 345/660; 358/3.13
(58) Field of Search .............................. 382/276, 293, 382/296, 302, 260, 261, 297, 232, 162, 298, 282; 348/441, 574, 580, 583, 576; 358/451, 457, 3.13; 345/483, 484, 486, 437, 438, 439, 153, 154, 126, 127, 596, 649, 660

(56) References Cited

U.S. PATENT DOCUMENTS

| | | | | |
|---|---|---|---|---|
| 3,558,811 A | | 1/1971 | Montevecchio et al. ....... 178/6 |
| 3,976,982 A | | 8/1976 | Eiselen .................... 340/172.5 |
| 4,620,288 A | | 10/1986 | Welmers ..................... 364/518 |
| 4,703,515 A | * | 10/1987 | Baroody, Jr. ................ 382/297 |
| 4,707,118 A | * | 11/1987 | Terashita ..................... 355/38 |
| 4,707,742 A | * | 11/1987 | Field et al. ................... 348/580 |
| 4,785,349 A | * | 11/1988 | Keith et al. .................. 348/390 |
| 4,853,843 A | | 8/1989 | Ecklund ...................... 364/200 |
| 4,860,375 A | * | 8/1989 | McCubbrey et al. ........ 382/303 |
| 4,897,799 A | * | 1/1990 | Le Gall et al. ............. 364/514 |
| 4,973,952 A | | 11/1990 | Malec et al. ........... 340/825.35 |
| 4,974,096 A | * | 11/1990 | Wash .......................... 358/302 |
| 5,040,068 A | * | 8/1991 | Parulski et al. ............. 348/376 |
| 5,086,393 A | | 2/1992 | Kerr et al. ................... 364/419 |
| 5,095,512 A | | 3/1992 | Roberts et al. ............... 382/56 |
| 5,099,444 A | | 3/1992 | Wilson et al. ......... 364/709.09 |
| 5,138,697 A | | 8/1992 | Yamamoto et al. ......... 395/120 |
| 5,191,406 A | | 3/1993 | Brandestini et al. .......... 358/22 |
| 5,237,432 A | * | 8/1993 | Calarco et al. ............. 358/451 |
| 5,471,320 A | * | 11/1995 | Jodoin et al. ............... 382/260 |
| 5,537,157 A | * | 7/1996 | Washino et al. ............ 348/722 |
| 5,640,468 A | * | 6/1997 | Hsu ........................... 382/190 |
| 5,664,216 A | * | 9/1997 | Blumenau .................... 345/202 |

OTHER PUBLICATIONS

Foley et al., Computer Graphics: Principles and Practice, 1990, pp. 585–587.*

* cited by examiner

Primary Examiner—Timothy M. Johnson
(74) Attorney, Agent, or Firm—Ingrid M. Foerster; Adby Raissinia; Bracewell & Patterson, L.L.P.

(57) ABSTRACT

The present invention provides a method and system for transforming image data from a present format to a requested format. A request for the image data is received wherein the request includes a requested format, the requested format includes a first plurality of parameters. A present format for the image data is determined in response to receiving a request for the image data, wherein the present format includes a second plurality of parameters describing the image data. The first plurality of parameters within the requested format is compared to the second plurality of parameters within the present format describing the image data, wherein each parameter within the first plurality of parameters corresponds to a parameter within the second plurality of parameters. Parameters from the first and second plurality of parameters are identified, wherein a match between a parameter within the first plurality of parameters and a corresponding parameter within the second plurality of parameters is absent. The image data is altered utilizing the identified parameters, wherein the image data is transformed from a present format to a requested format.

17 Claims, 13 Drawing Sheets

IMAGE FORMAT CONVERSION SUCH AS PHOTOMETRIC, ROTATION, CROPPING, PADDING, SCALING, DITHERING, BIT PADDING, GRAYSCALE AND COLOR TRANSFORMATION, ENCODING AND DECODING USING A PLURALITY OF FILTERS

This is a continuation, of application Ser. No. 08/304,726, filed Sep. 12, 1994, now abandoned.

BACKGROUND OF THE INVENTION

1. Technical Field

The present invention relates in general to an improved data processing system and in particular to an improved method and system for transforming image data from one format to another. Still more particularly, the present invention relates to an improved method and system for transforming image data from one format to another wherein the number of converters required is reduced.

2. Description of the Related Art

Images may be manipulated within a data processing system by a user. The manipulation of images may include placing an image within a document in a word processing application, altering an existing image, or creating an image utilizing a drawing application. In the instance where an image is imported or sent from one application to another, the format of the image in the originating program may be different from that of the target application. Such a situation typically requires conversion of the image into the format required by the target application. Importing an image from a file located on a disk also may require conversion or transformation of the image to meet the requirements of the program in which the image is to be utilized. A number of different image converting programs are presently available. These image programs can convert a number of different input images into a number of different output formats. For example, if M input image types and N output image types are desired M×N different conversion programs are possible. To avoid this, presently available image conversion applications employ universal intermediate formats using the lowest common denominator and split the conversion into a two step process. First, an image format is converted into the intermediate format and then the intermediate format is converted to the output format. Such a technique reduces the number of converters required to M+N converters. This two step process, however, is inefficient in that the process must always convert the image into a lowest common denominator intermediate format. Such a conversion can result in unnecessary work in many cases where common features between the input format and the output format are present.

Therefore, it would be advantageous to have an image conversion process that reduced the amount of processing required to convert image data from the original or input format into the desired output format.

SUMMARY OF THE INVENTION

It is therefore one object of the present invention to provide an improved data processing system.

It is another object of the present invention to provide an improved method and system for transforming image data from one format to another.

It is yet another object of the present invention to provide. Still more particularly, the present invention relates to an improved method and system for transforming image data from one format to another wherein the number of converters required is reduced.

The foregoing objects are achieved as is now described. The present invention provides a method and system for transforming image data from a present format to a requested format. A request for the image data is received wherein the request includes a requested format, the requested format includes a first plurality of parameters. A present format for the image data is determined in response to receiving a request for the image data, wherein the present format includes a second plurality of parameters describing the image data. The first plurality of parameters within the requested format is compared to the second plurality of parameters within the present format describing the image data, wherein each parameter within the first plurality of parameters corresponds to a parameter within the second plurality of parameters. Parameters from the first and second plurality of parameters are identified, wherein a match between a parameter within the first plurality of parameters and a corresponding parameter within the second plurality of parameters is absent. The image data is altered utilizing the identified parameters, wherein the image data is transformed from a present format to a requested format.

The image data is altered by creating a filter system utilizing the identified parameters. The image data is padded through the filter system. The filter system is created by selecting a filters utilizing the identified parameters and connecting the plurality of filters together, wherein a first filter in the plurality of filters provides an input for the filter system for the image data and a last filter in the plurality of filters provides an output for the filter system.

The above as well as additional objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 5 depicts an image request vector in accordance with a preferred embodiment of the present invention;

DETAILED DESCRIPTION OF PREFERRED EMBODIMENT

Figure 1:
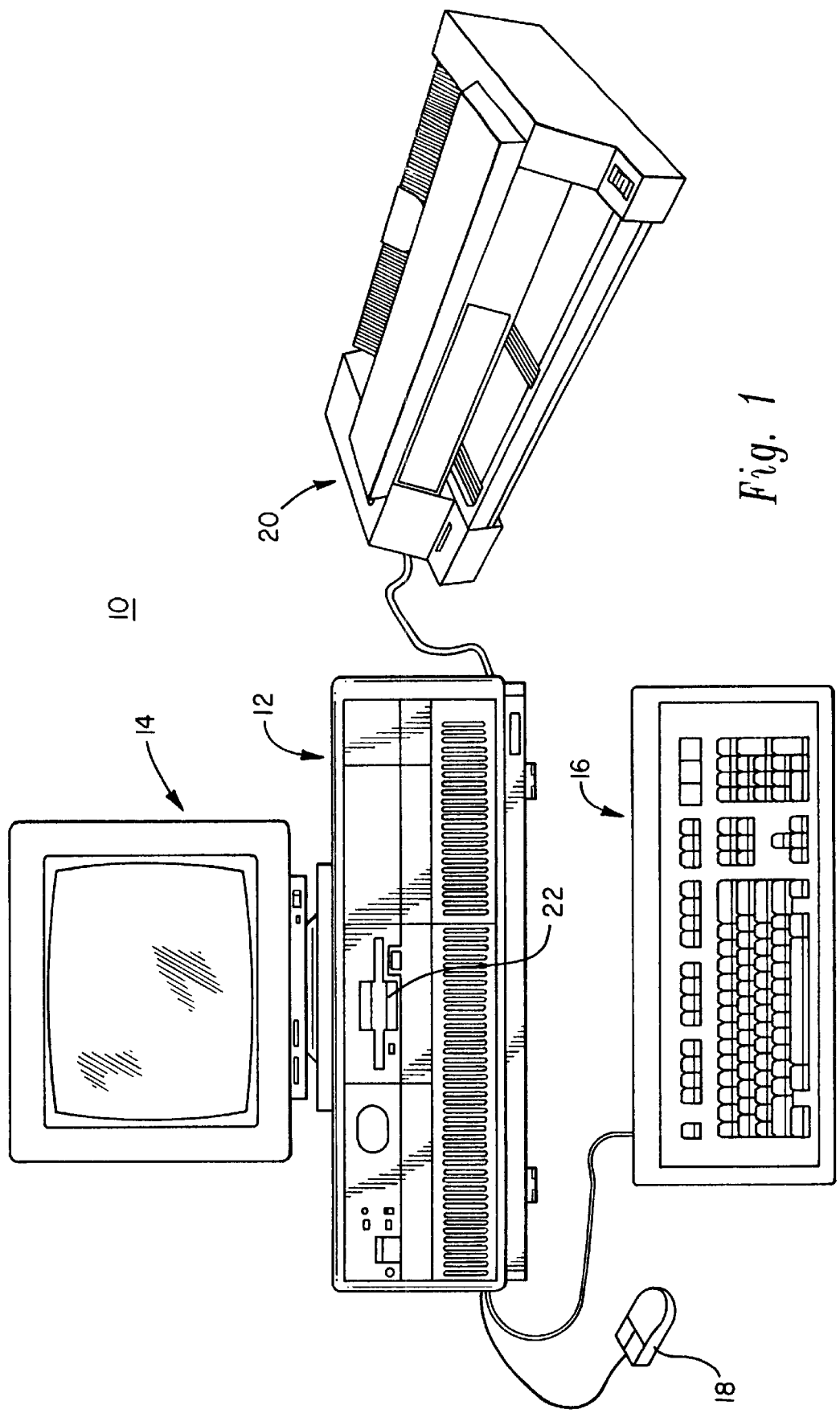
FIG. 1 depicts a data processing system, a personal computer system, in which the present invention may be employed.

With reference now to the figures and in particular with reference to FIG. 1, there is shown a data processing system, personal computer system 10, in which the present invention can be employed is depicted. As shown, personal computer system 10 comprises a number of components, which are interconnected together. More particularly, a system unit 12 is coupled to and can drive an optional monitor 14 (such as a conventional video display). A system unit 12 also can be optionally coupled to input devices such as a PC keyboard 16 or a mouse 18. Mouse 18 includes right and left buttons (not shown). The left button is generally employed as the main selector button and alternatively is referred to as the first mouse button or mouse button 1. The right button is typically employed to select auxiliary functions as explained later. The right mouse button is alternatively referred to as the second mouse button or mouse button 2. An optional output device, such as a printer 20, also can be connected to the system unit 12. Finally, system unit 12 may include one or more mass storage devices such as the diskette drive 22.

As will be described below, the system unit 12 responds to input devices, such as PC keyboard 16, the mouse 18, or local area networking interfaces. Additionally, input/output (I/O) devices, such as diskette drive 22, display 14, printer 20, and local area network communication system are connected to system unit 12 in a manner well known. Of course, those skilled in the art are aware that other conventional components also can be connected to the system unit 12 for interaction therewith. In accordance with the present invention, personal computer system 10 includes a system processor that is interconnected to a random access memory (RAM), a read only memory (ROM), and a plurality of I/O devices.

In normal use, personal computer system 10 can be designed to give independent computing power to a small group of users as a server or a single user and is inexpensively priced for purchase by individuals or small businesses. In operation, the system processor functions under an operating system, such as IBM's OS/2 operating system or DOS. OS/2 is a registered trademark of International Business Machines Corporation. This type of operating system includes a Basic Input/Output System (BIOS) interface between the I/O devices and the operating system. BIOS, which can be stored in a ROM on a motherboard or planar, includes diagnostic routines which are contained in a power on self test section referred to as POST.

Figure 2:
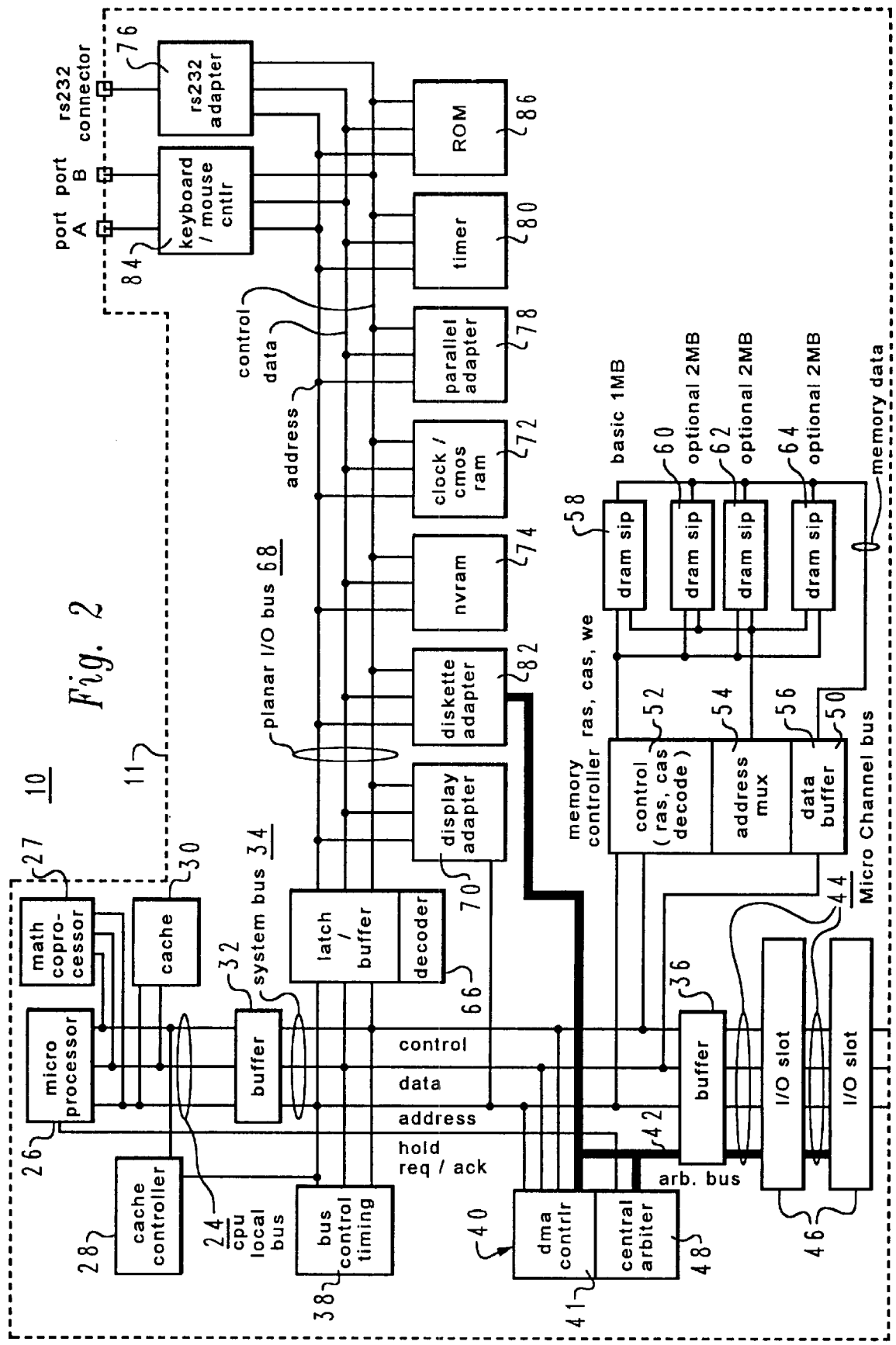
FIG. 2 is a block diagram of the data processing system illustrated in FIG. 1.

Prior to relating the above structure to the present invention, a summary of the operation in general of personal computer system 10 may merit review. Referring to FIG. 2, there is shown a block diagram of personal computer system 10 illustrating the various components of personal computer system 10 in accordance with the present invention. FIG. 2 further illustrates components of planar 11 and the connection of planar 11 to the I/O slots 46 and other hardware of personal computer system 10. Connected to planar 11 is the system central processing unit (CPU) 26 comprised of a microprocessor which is connected by a high speed CPU local bus 24 through a bus controlled timing unit 38 to a memory control unit 50 which is further connected to a volatile random access memory (RAM) 58. While any appropriate microprocessor can be used for CPU 26, one suitable microprocessor is the 80386 which is sold by Intel.

While the present invention is described hereinafter with particular reference to the system block diagram of FIG. 2, it is to be understood at the outset of the description which follows, it is contemplated that the apparatus and methods in accordance with the present invention may be used with other hardware configurations of the planar board. For example, the system processor could be an Intel 80286, 80486, or Pentium microprocessor. "Pentium" is a trademark of Intel Corporation. These particular microprocessors can operate in a real addressing mode or a protected addressing mode. Each mode provides an addressing scheme for accessing different areas of the microprocessor's memory.

Returning now to FIG. 2, CPU local bus 24 (comprising data, address and control components) provides for the connection of CPU 26, an optional math coprocessor 27, a cache controller 28, and a cache memory 30. Also coupled on CPU local bus 24 is a buffer 32. Buffer 32 is itself connected to a slower speed (compared to the CPU local bus) system bus 34, also comprising address, data and control components. System bus 34 extends between buffer 32 and a further buffer 36. System bus 34 is further connected to a bus control and timing unit 38 and a Direct Memory Access (DMA) unit 40. DMA unit 40 is comprised of a central arbitration unit 48 and a DMA controller 41. Buffer 36 provides an interface between the system bus 34 and an optional feature bus such as the Micro Channel bus 44. "Micro Channel" is a registered trademark of International Business Machines Corporation. Connected to bus 44 are a plurality of I/O slots 46 for receiving Micro Channel adapter cards which may be further connected to an I/O device or memory. An arbitration control bus 42 couples the DMA controller 41 and central arbitration unit 48 to I/O slots 46 and diskette adapter 82. Also connected to system bus 34 is a memory control unit 50 which is comprised of a memory controller 52, an address multiplexer 54, and a data buffer 56. Memory control unit 50 is further connected to a random access memory as represented by RAM module 58. Memory controller 52 includes the logic for mapping addresses to and from CPU 26 to particular areas of RAM 58. While the microcomputer system 10 is shown with a basic 1 megabyte RAM module, it is understood that additional memory can be interconnected as represented in FIG. 2 by the optional memory modules 60 through 64.

A further buffer 66 is coupled between system bus 34 and a planar I/O bus 68. Planar I/O bus 68 includes address, data, and control components respectively. Coupled along planar bus 68 are a variety of I/O adapters and other peripheral components such as display adapter 70 (which is used to drive an optional display 14), a clock 72, nonvolatile RAM 74 (hereinafter referred to as "NVRAM"), a RS232 adapter 76, a parallel adapter 78, a plurality of timers 80, a diskette adapter 82, a PC keyboard/mouse controller 84, and a read only memory (ROM) 86. The ROM 86 includes BIOS which provides the user transparent communications between many I/O devices.

Clock 72 is used for time of day calculations. NVRAM 74 is used to store system configuration data. That is, the NVRAM will contain values which describe the present configuration of the system. For example, NVRAM 74 contains information which describe the capacity of a fixed disk or diskette, the type of display, the amount of memory, etc. Of particular importance, NVRAM 74 will contain data which is used to describe the system console configuration; i.e., whether a PC keyboard is connected to the keyboard/mouse controller 84, a display controller is available or the ASCII terminal is connected to RS232 adapter 76. Furthermore, these data are stored in NVRAM 74 whenever a special configuration program is executed. The purpose of the configuration program is to store values characterizing the configuration of this system to NVRAM 76 which are saved when power is removed from the system.

Connected to keyboard/mouse controller 84 are ports A and B. These ports are used to connect a PC keyboard (as opposed to an ASCII terminal) and mouse to the PC system. Coupled to RS232 adapter unit 76 is an RS232 connector. An optional ASCII terminal can be coupled to the system through this connector.

Specifically, personal computer system 10 may be implemented utilizing any suitable computer such as the IBM PS/2 computer or an IBM RISC SYSTEM/6000 computer, both products of International Business Machines Corporation, located in Armonk, N.Y. "RISC SYSTEM/6000" is a trademark of International Business Machines Corporation and "PS/2" is a registered trademark of International Business Machines Corporation.

Figure 3:
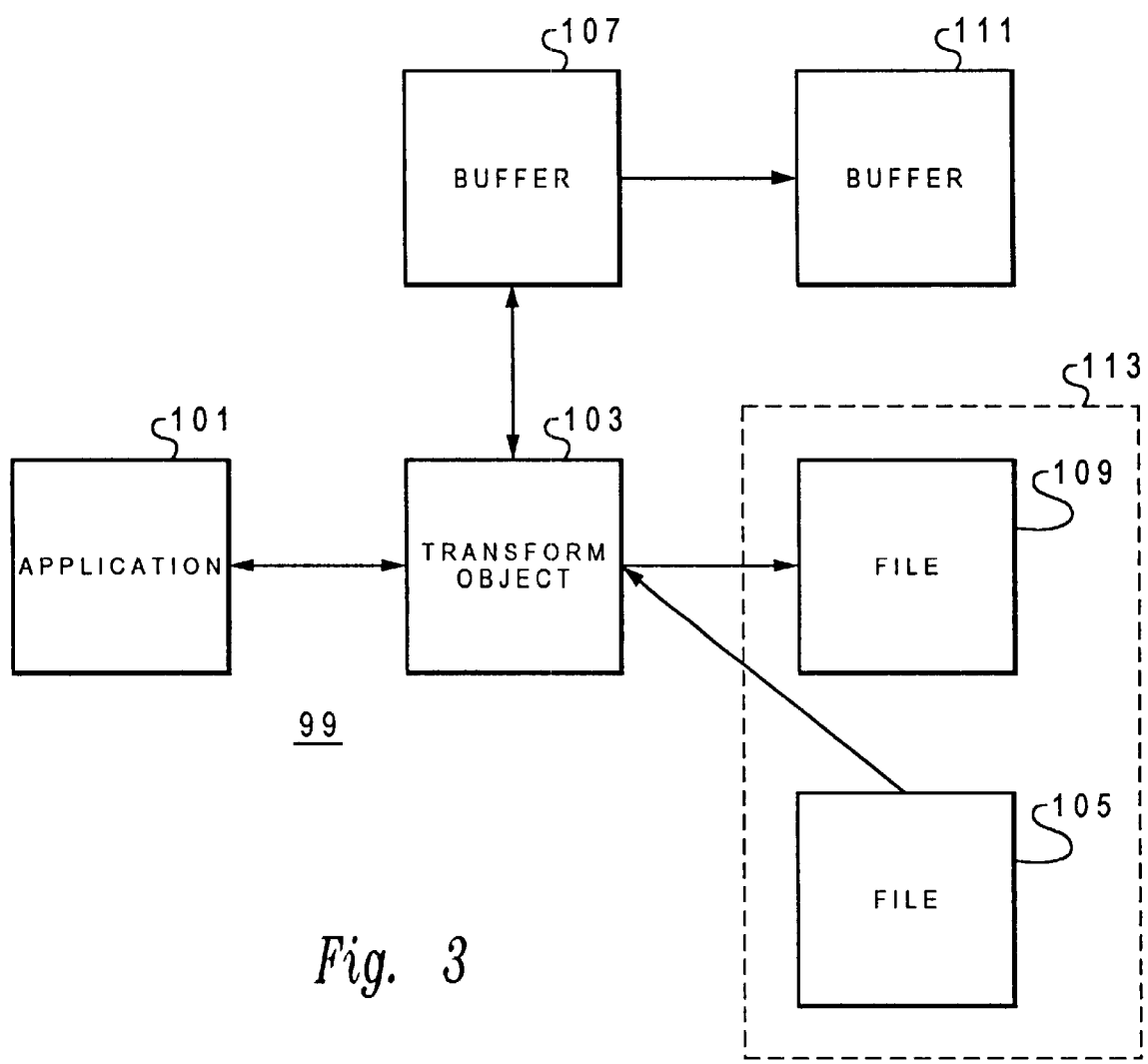
FIG. 3 depicts a block diagram of components involved in converting images in accordance with a preferred embodiment of the present invention.

Referring now to FIG. 3, a block diagram of the components involved in converting images is depicted in accordance with a preferred embodiment of the present invention. Application 101 sends commands to transform object 103 to read and write image data. Transform object 103 may read image data from file 105 and transfer it to buffer 107 in a format specified or usable by application 101. Transform object 103 performs the necessary modifications to the image data to provide a format for the image data that is specified or required by application 101. In addition, transform object 103 may be employed to write image data from buffer 107 to file 109. Again, transform object 103 may be employed to change the format of the image data as needed. Transform object 103 also may be used to directly write image data from file 105 to file 109. Transform object 103 may be employed to change the format of the image data in a file-to-file write. Similarly, transform object 103 may be used to write image data from buffer 107 to buffer 111. Files 105 and 109 are located in a data storage device 113, such as a hard drive. Application 101, transform object 103, and buffers 107 and 111 are found in memory 115 in accordance with a preferred embodiment of the present invention.

Figure 4:
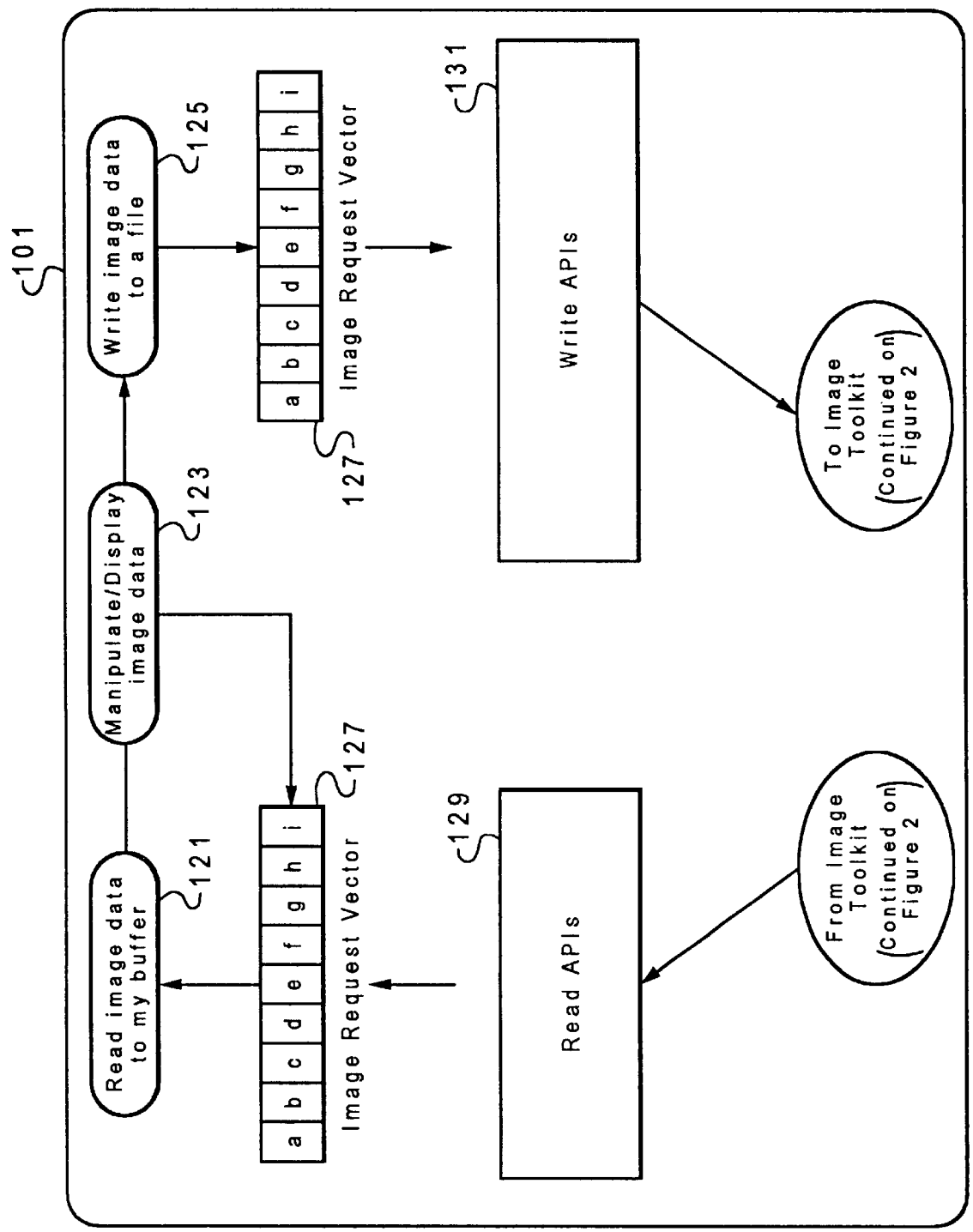
FIG. 4 is a block diagram of an application employing the services of a transform object in accordance with a preferred embodiment of the present invention.

Referring now to FIG. 4, a block diagram of an application employing the services of a transform object is depicted in accordance with a preferred embodiment of the present invention. Application 101 reads data into a buffer as illustrated in block 121. The application then may manipulate image data, as depicted in block 123. Thereafter, application 101 can write the image data to a file, as illustrated in block 125. Data is written into a buffer using an image request vector such as the one depicted in FIG. 5. Image request vector 127 in FIG. 5 is a data structure containing a number of fields that are employed to control the format of the image returned by the transform object. Various parameters may be set within the image request vector, such as: model, format, bits per sample, width (in pels) height (in pels), horizontal resolution (in DPI), vertical resolution (in DPI), photometric, and orientation. Although the image request vector in this embodiment depicts a vector containing nine fields, other numbers of fields may be employed and other types of data structures other than a vector may be used in accordance with a preferred embodiment of the present invention.

Referring back to FIG. 5, when manipulating or displaying image data, application 101 may set fields within image request vector 127 to cause transform object 103 to return image data in the format specified by application 101. A request to read and write image data is accomplished by employing read and write application program interface (API) calls, read API calls 129 and write API calls 131 that are sent to transform object 103 in accordance with a preferred embodiment of the present invention.

Figure 6:
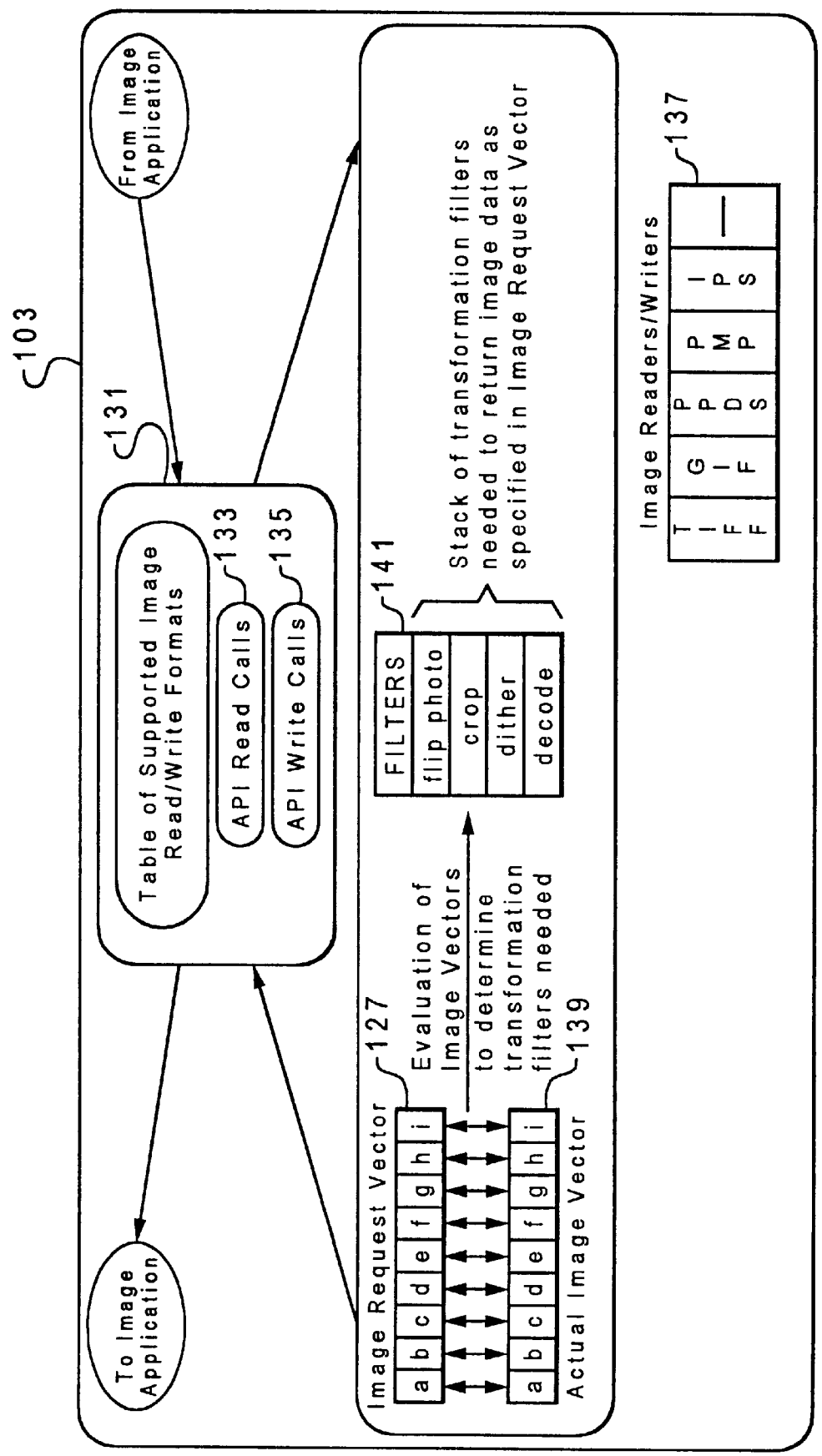
FIG. 6 is a block diagram of a transform object illustrated in accordance with a preferred embodiment of the present invention.

Referring now to FIG. 6, a block diagram of a transform object is illustrated in accordance with a preferred embodiment of the present invention. Transform object 103 receives requests from application 101 via read and write API calls sent from the application. Transform object 103 includes a table of supported image read/write formats 132, API read calls 133, and API write calls 135, as illustrated in block 131. Table of supported image read/write formats 132 is a table of known images readers and writers. API read calls 133 and API write calls 135 are employed to cause image readers/writers 137 to read or write image data. Image readers/writers 137 may be comprised of known readers and writers such as, for example: BMP from Microsoft/IBM; Tag Image File Format (TIFF) from Aldus; PC Paintbrush format (PCX) from Zsoft; and GIF from Compuserve.

API read calls 133 and API write calls 135 are calls to the image readers and writers to control the reading or writing of image data. The API calls employed are defined by the requirements of each particular reader or writer within image readers/writers 137 in accordance with a preferred embodiment of the present invention. Transform object 103 determines an actual image vector 139, which describes the format of the image to be read or written. Image request vector 127 is received from application 101 and is compared to actual image vector 139 to determine what filters are needed. After such an evaluation, filter stack 141 is constructed to return the image data specified in image request vector 127.

Figure 7:
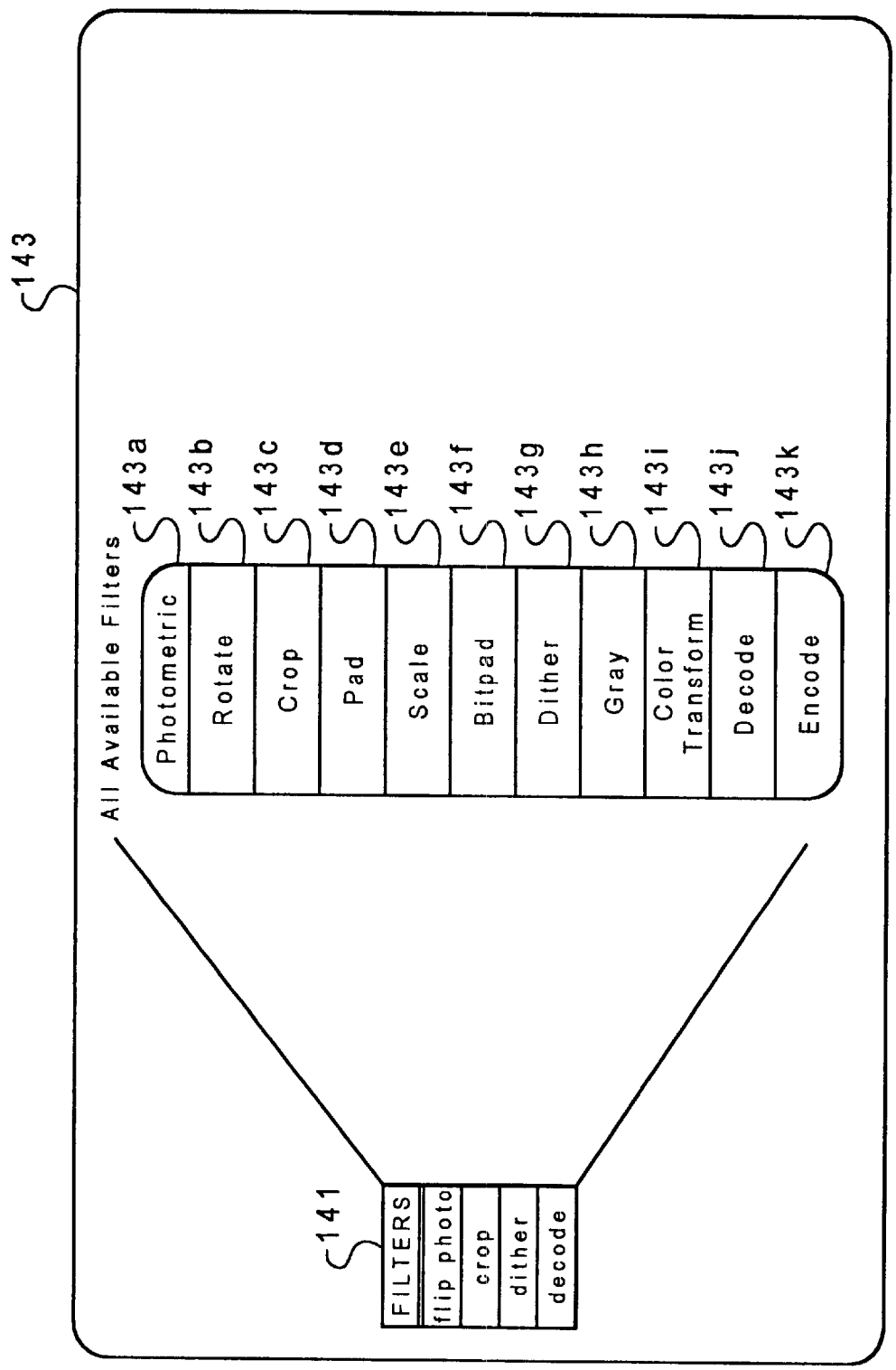
FIG. 7 depicts filters accessed by a transform object in accordance with a preferred embodiment of the present invention.

Filters are accessed by transformation object 103 from filter library 143, as depicted in FIG. 7. Filter library 143 contains a number of different filters available for performing various image transformations. In the depicted example, filter library 143 includes the following filters: photometric 143a, rotate 143b, crop 143c, pad 143d, scale 143e, bit pad 143f, dither 143g, gray 143h, color transform 143i, decode 143j, and encode 143k. These filters are employed by transformation object 103 to provide the necessary transformation or alteration of image data to return image data in a form as specified in image request vector 127. Transform object 103 selects a number of filters to create a filter stack 141 for use in manipulating the image data. These filters may be used when image readers/writers 137 is employed to read or write data in accordance with a preferred embodiment of the present invention. More information on filters may be found in Foley et al., *Computer Graphics: Principles and Practice* (2d ed. 1991).

Figure 8A:
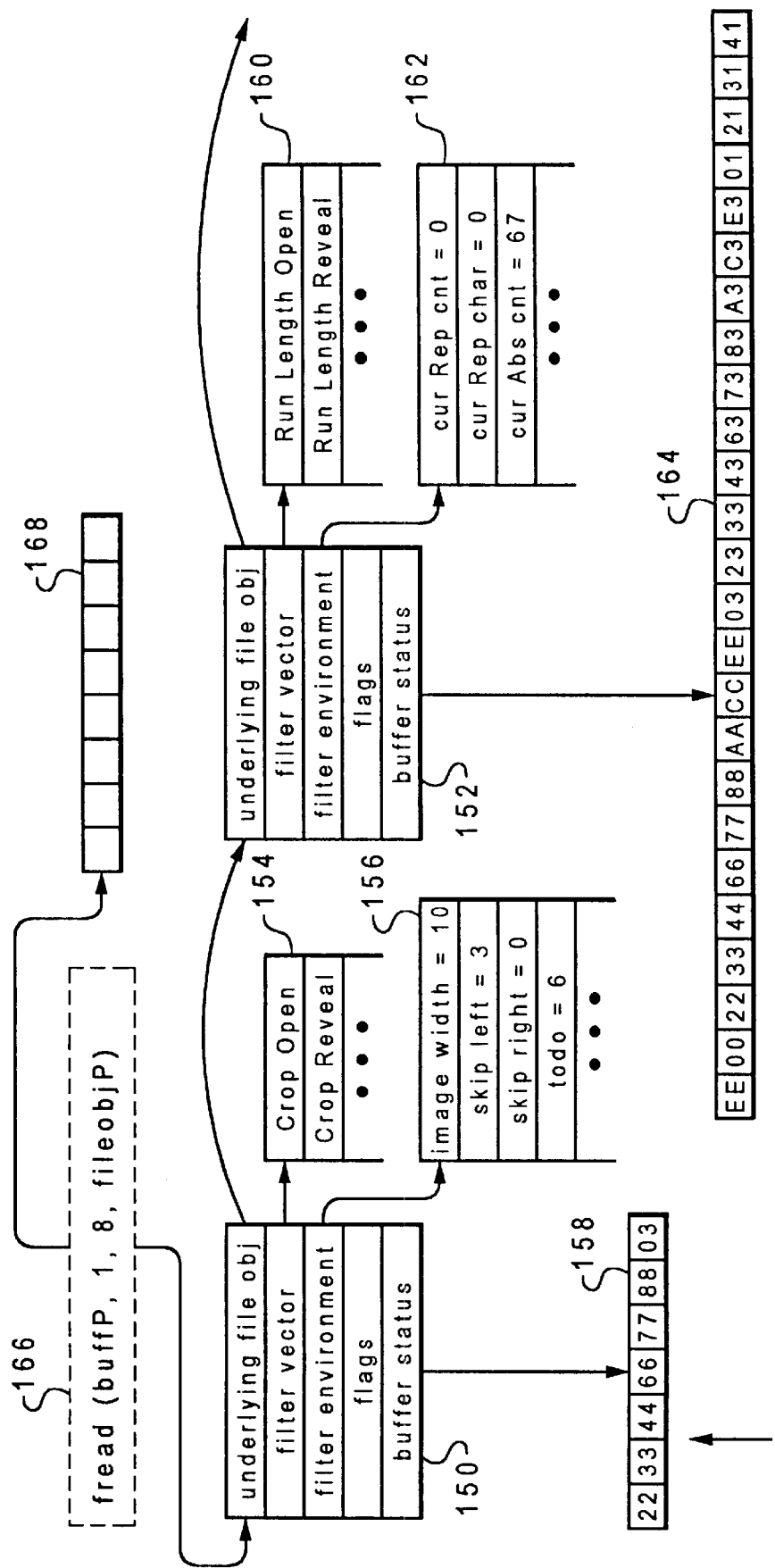
FIGS. 8A and 8B are diagrams of file objects depicted in accordance with a preferred embodiment of the present invention.
Figure 8B:
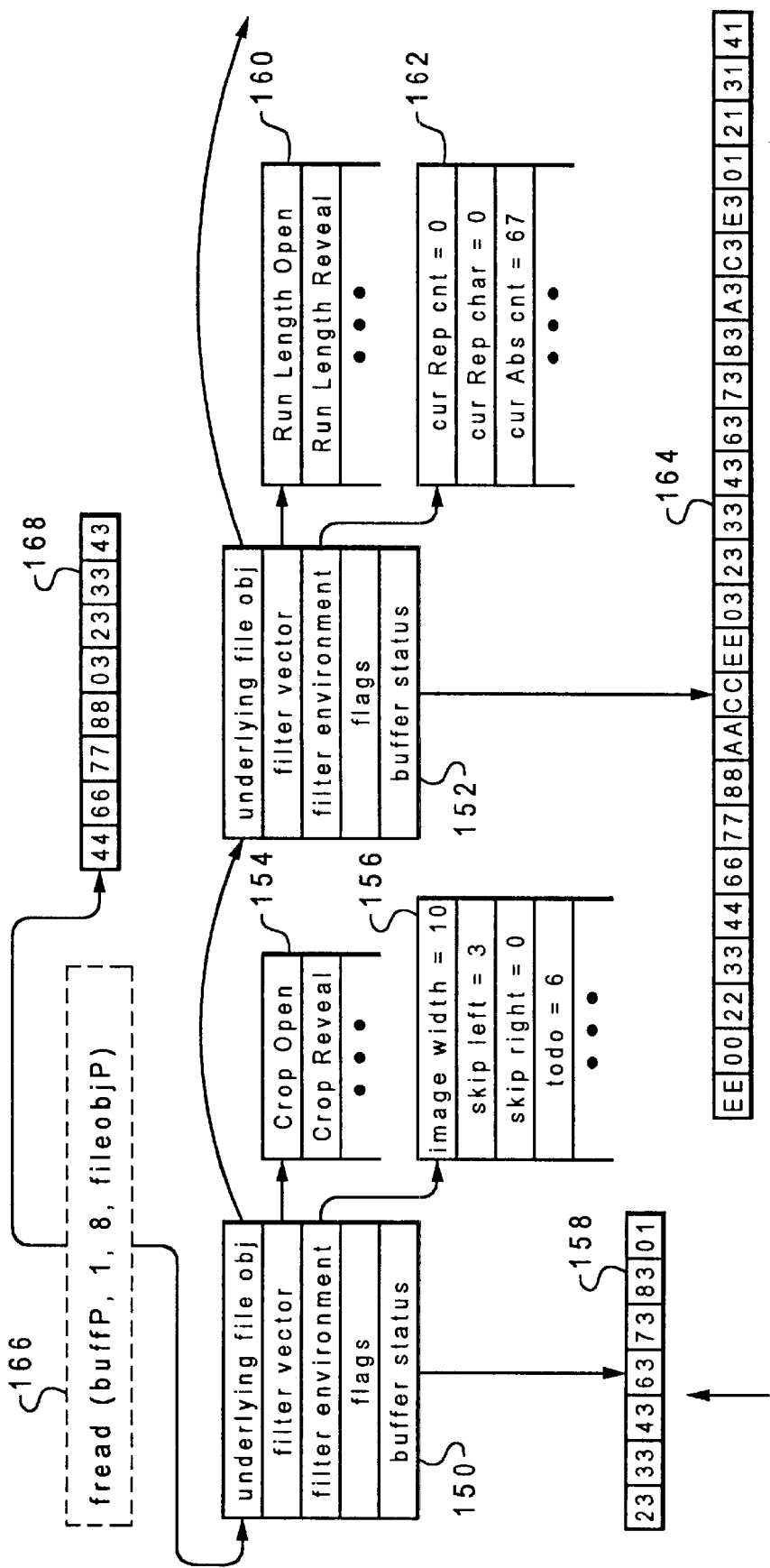

With reference now to FIGS. 8A and 8B, diagrams of file objects are depicted in accordance with a preferred embodiments of the present invention. FIG. 8A shows a "before" condition of the file objects and FIG. 8B shows an "after" condition of the file objects to demonstrate the flow of data. File objects 150 and 152 are depicted in this example. Each file object contains the following data: a pointer to an underlying file object, a pointer to the filter vector, a pointer to the filter environment, flags, and buffer status. The pointer to the underlying file object in filter 150 points to file object 152. The pointer to the filter vector in filter object 150 points to filter vector 154, which in the depicted example is a crop filter. The pointer to the filter environment in filter object 150 points to memory 156, which contains information which may be used by filter vector 154 in converting or transforming image data. The flags in file object 150 are set to indicate various conditions, such as an error or end of file. The buffer status in a filter object includes information about the buffer associated with the filter object, such as the buffer size, the location of the buffer, and how many bytes are left in buffer 158. The pointer to the filter vector in file object 152 points to filter vector 160. The pointer to the filter environment in file object 152 points to memory 162. The buffer status information in file object 152 relates to buffer 164.

An application (not shown) calls the transformation object using a procedure call or API call, which results in call 166 being made. Information flows from buffer 164 to buffer 158 and finally to buffer 168 in the depicted example. The depicted example in these figures are described in the context of C language syntax and language conventions. An application requesting image data in a selected format results in the transform object issuing a call: fread (buffP,1,8, fileobjP). This fread being called is a F_fread routine, which is part of the filter I/O package found in known filters. The F_fread routine examines the buffer status in file object 150. In the depicted example, five bytes of data are left in buffer 158. These bytes are copied into the caller's, buffer 168, which is pointed to by buffP. Specifically, bytes 44, 66, 77, 88 and 03 from buffer 158 are copied into buffer 168. F_fread is required to supply three more bytes. In view of the small number of bytes, F_fread calls the read routine in filter vector 154 to refill the buffer. This assumes a read routine is present in filter vector 154. The call by F_fread to the filter vector 154 is as follows: CNT=(*fileobjP->FilterVector->FilterRead)(fileobjP, fileobjP->BufferP, fileobjP->BufferSize). From the point of view of filter vector 154, which is a crop read filter vector, the call is: CropRead (fP, bufferp, length). CropRead is the read routine of the crop filter in filter vector 154. The read routine of filter vector 154 would set its local pointers to its environment and the underlying file object from the file object pass to it (envP+FLGETENV(fP) and ufP+FLGETUFD(fP). From the environment, six bytes are still left in the scan line for processing, which are less than the seven of bytes CropRead needs to read. In this particular example, seven is the length of the size of the buffer passed. As a result, the read routine of vector filter 154, CropRead, will make the following call to filter vector 160: fread(bufferP,1,min(envP->todo,toread), ufP).

This F_fread routine called by fread examines the buffer status in the file object passed to it. In this case, the file object is file object 152. An examination reveals that more bytes are left, thirteen, than are necessary to fulfill the request for vector filter 154. As a result, six bytes are copied into the caller's buffer, buffer 158, from buffer 164 which is pointed at by bufferP. In particular, bytes 23, 33, 43, 63, 73 and 83 were copied from buffer 164 into buffer 158. The buffer status of the file object 150 pointed at by ufP is updated and the number of items successfully read is returned.

The read routine of vector filter 154 processes the data in its buffer calling the recede routine in filter vector 160 when needed. As a result, an application may read converted image data from buffer 168 using the filter stack which includes filter vectors 154 and 160. The pointer of the underlying file object in file object 152 may point to another file object (not shown). At the end of this chain is a file or buffer containing the image data that is to be converted. The initial reading of the image is performed by an image reader found in transform object 103. Similarly, data can be written from buffer 168 into a file using a filter stack as depicted in FIGS. 8A and 8B.

Figure 9:
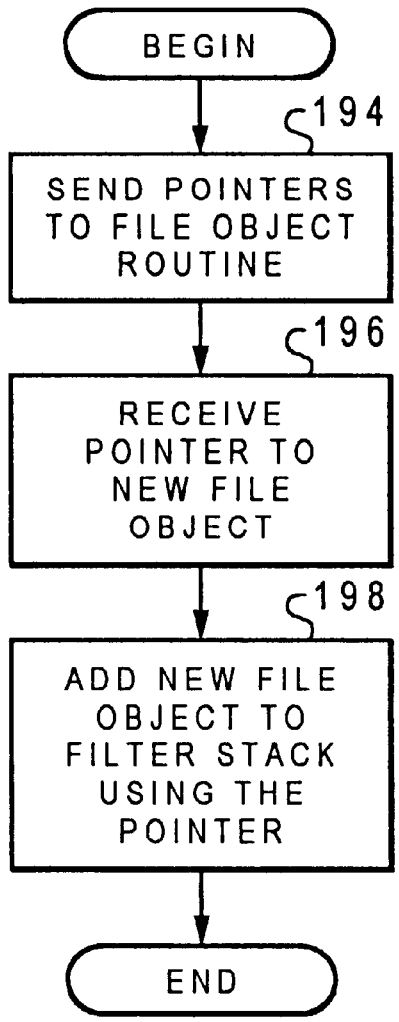
FIG. 9 depicts a process for adding a filter to a filter stack in accordance with a preferred embodiment of the present invention.

Referring now to FIG. 9, a process for adding a filter to a filter stack is depicted in accordance with a preferred embodiment of the present invention. The process begins by sending pointers to the file object routine as illustrated in block 194. The file object routine is described in more detail below in FIG. 10. The pointer is sent to the file object routine include a pointer to the current file object to which the new file object is to be connected to, a pointer to the filter vector for the filter to be added. A pointer to filter parameters located in the filter environment may be sent to the filter. The process then receives a pointer to the new file object, as depicted in block 196. The process then terminates after adding the new file object to the filter stack using the pointer returned by the file object routine as illustrated in block 198.

Figure 10:
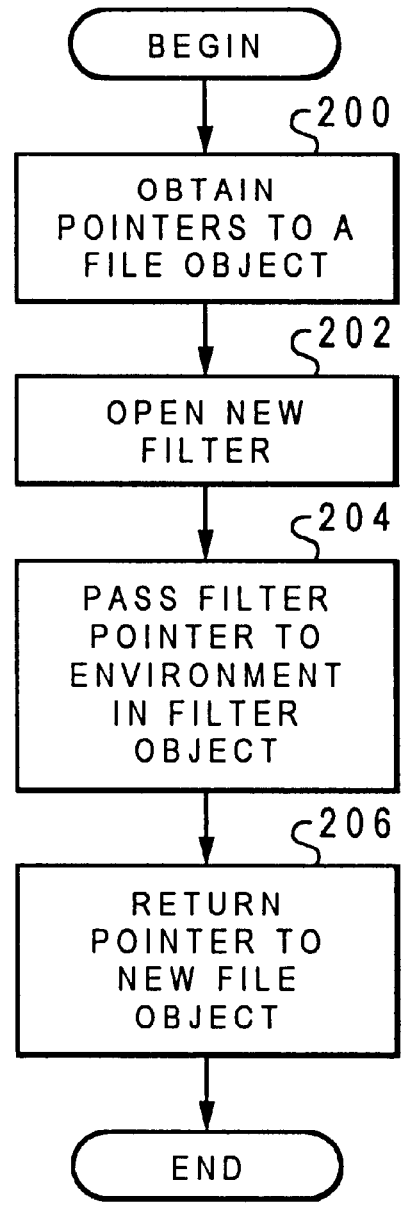
FIG. 10 is a flow chart of a process for installing a filter in a filter stack in accordance with a preferred embodiment of the present invention.

Referring now to FIG. 10, a flowchart of a process for installing a filter in a filter stack is depicted in accordance with a preferred embodiment of the present invention. A filter is represented by a vector of routines, which it supplies. All image filters supply routines to open, read, and close. The process begins obtaining a pointer to the current file object for the filter stack, a pointer to a filter's vector of routines, and a pointer to the filter environment, which contains filter parameters, such as image height and width, as illustrated in block 200. The process then receives a pointer to a new file object, representing the additional filter installed, as depicted in block 206.

The process then invokes a routine to open the new filter, as illustrated in block 202. The process then passes the filter a pointer to the filter environment, as depicted in block 204. The process terminates after supplying the filter with a pointer to a file object to be associated with filter, as illustrated in block 206. The new file object typically does not have a buffer at this point and time. The filter optionally may establish a buffer for its use. In accordance with a preferred embodiment of the present invention, the filter can read information from the file object, such as encoded header information. Information that the filter requires to be retained from the optional parameters may be passed to the filter or may be placed in memory in the filter environment pointed at by the filter environment pointer in the file object.

When other routines in the filter vector for this new filter are called, these routines are supplied with a pointer to the new file object and will thus have access to both the environment and the underlying data stream being processed by the filter vector.

Figure 11:
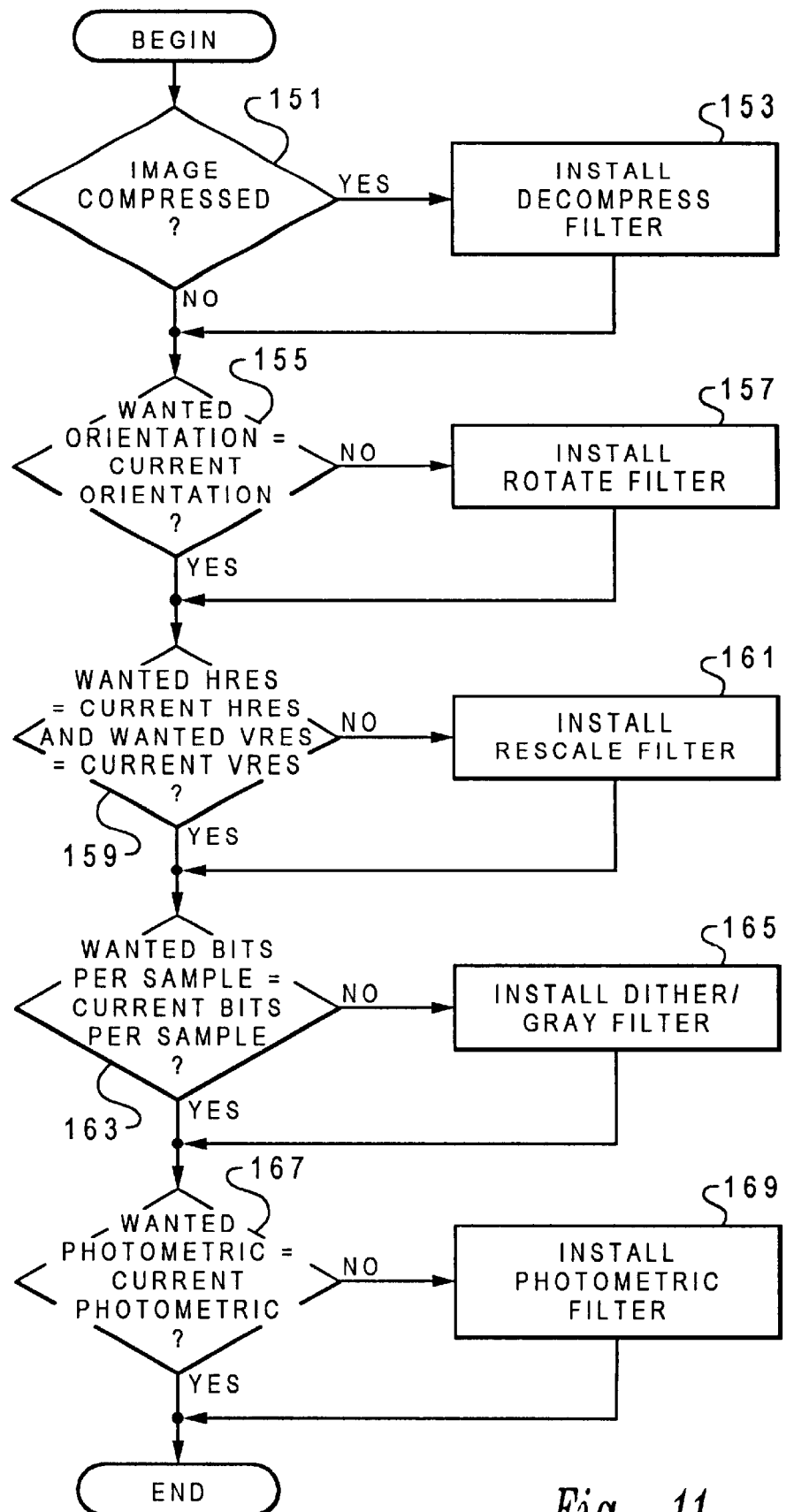
FIG. 11 depicts a flow chart of a process for constructing a filter stack in accordance with a preferred embodiment of the present invention.

With reference to FIG. 11, a flowchart of a process for constructing a filter stack is illustrated in accordance with a preferred embodiment of the present invention. This process is performed when image request vector 127 is compared to actual image vector 139, as depicted in FIG. 6. A determination of whether the image is compressed is made, as illustrated in block 151. If the image is compressed, a decompress filter is installed, as depicted in block 153. Thereafter, a determination of whether the wanted orientation is equal to the current orientation, as illustrated in block 155. If the answer is no a rotate filter is installed, as depicted in block 157. Next, the process determines whether the wanted horizontal resolution (hres) is equal to the current horizontal resolution (hres) and whether the wanted vertical resolution (vres) is equal to the current vertical resolution (vres), as illustrated in block 159. If the answer is no, the process installs a rescale filter as depicted in block 161. Then, a determination of whether the wanted bits per sample is equal to the current bits per sample is made.

Upon a determination that the wanted bits per sample does not equal the current bits per sample, a dither/gray filter is installed, as depicted in block 165. Next, a determination of whether the wanted photometric is equal to the current photometric is made, as illustrated in block 167. If the answer is no, the process then installs a photometric filter, as depicted in block 169. The process then terminates. Referring again to decision block 151, If the image is not compressed, a decompress filter is not installed. In block 155, if the wanted orientation is equal to the current orientation, a rotate filter is not installed. Similarly, if the wanted horizontal and vertical resolutions are equal to the current vertical and horizontal resolutions, a rescale filter is not installed. If the current bits per sample equals the wanted bits per sample a dither/gray filter is left out of the filter stack. A correct photometric results in the photometric filter being left out of the filter stack.

Figure 12:
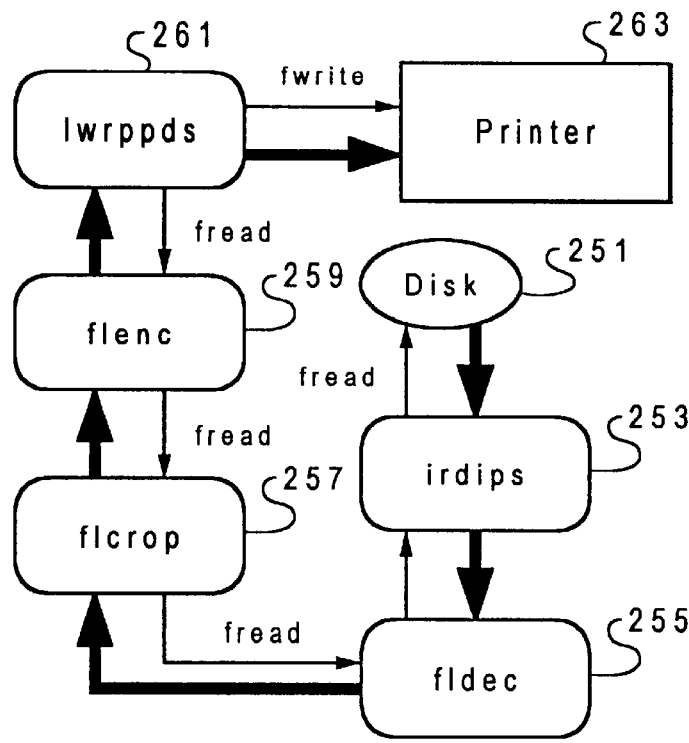
FIG. 12 is a diagram depicting the reading of data from a file to a printer in accordance with a preferred embodiment of the present invention.

Referring now to FIG. 12, a diagram depicting the reading of data from a file to a printer is illustrated in accordance with a preferred embodiment of the present invention. An image file in a facsimile format is located on disk 251. The transform object creates an actual image vector from the image file and compares it with the image request vector. After such a comparison, it is determined that three filters: decode, crop, and encode are required to place the image data in the format specified by the image request vector. Transform object 203 first employs reader 253 to read the data from the disk and delete the wrapper. A "wrapper" merely describes the disk image file, i.e., width, height, presence or absence of,data compression, etc. The image data is sent to filter 255, which decodes the data. Thereafter the data is sent through filter 257 to crop the image data, and finally the images data is encoded utilizing filter 259. Thereafter, block 261 is employed to place the wrapper information, expected by the printer, with the image data. The data it then sent to printer 261 and printed.

Figure 13:
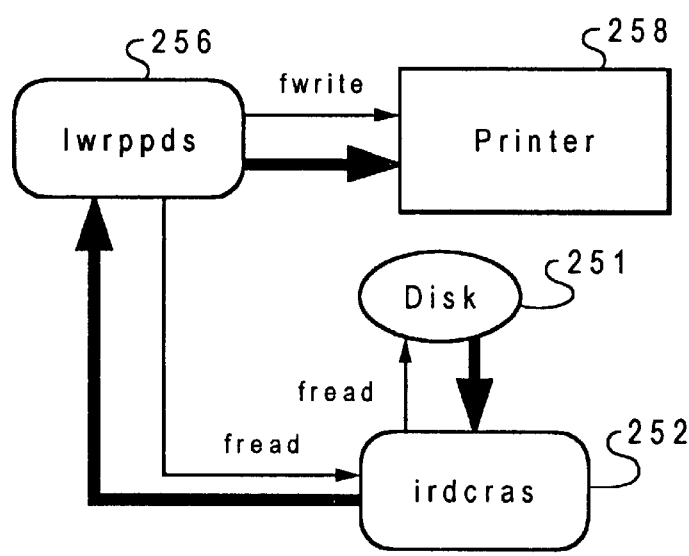
FIG. 13 depicts the transfer of data from a disk in accordance with a preferred embodiment of the present invention.

Referring now to FIG. 13, disk 251 contains data in a raster file format in the depicted example. Reader 252 is employed to remove the wrapper from the data in the image file stored on disk 251. The image data is sent to block 256, which places the wrapper expected by the printer with the image data. Thereafter, the image data is sent to printer 258 and the image is printed.

Figure 14:
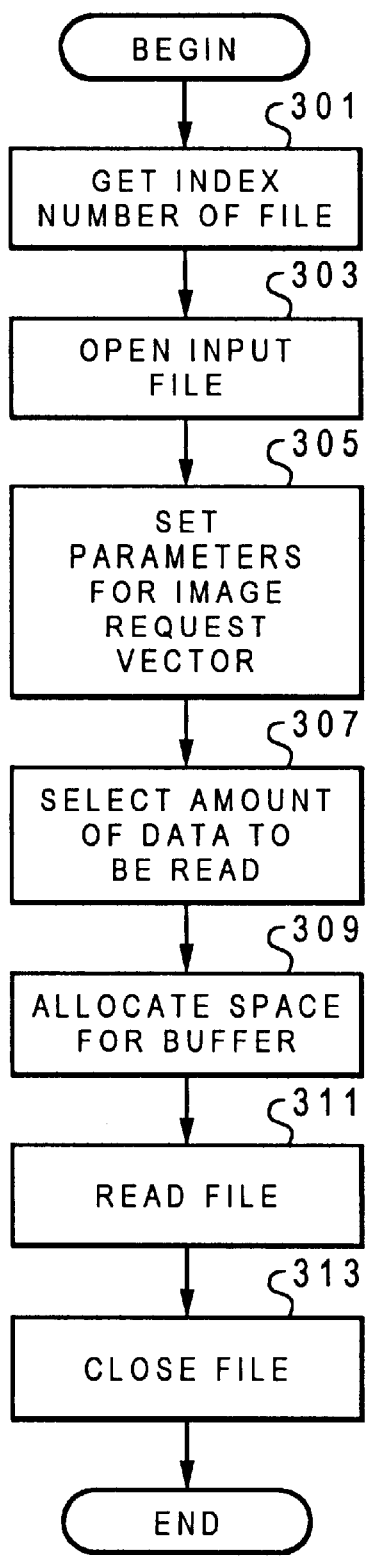
FIG. 14 is a flow chart of a process for reading an image from a file to a buffer in accordance with a preferred embodiment of the present invention.

Referring now to FIG. 14, a process of reading an image from a file to a buffer according to the present invention is depicted. The process first obtains an index number for the file, as illustrated in block 301. The index number is obtained from the file and identifies the format of the file. Next, an input file is opened, as depicted in block 303. After the input file has been opened, parameters are set for the image request vector, as illustrated in block 305. Setting the parameters for the image request vector is performed to determine how the incoming data is going to be handled. The amount of data to be read is selected, as depicted in block 307. Thereafter, space is allocated for a buffer in which the data will be placed, as illustrated in block 309. The file is then read using the image request vector, as depicted in block 311. Thereafter, the process closes the file, as illustrated in block 313.

Figure 15:
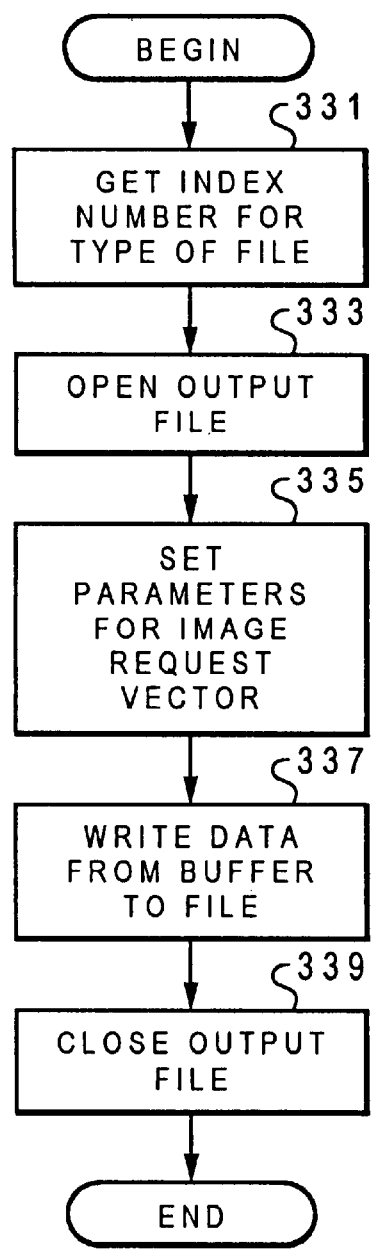
FIG. 15 depicts a flow chart of a process for writing data from a buffer to a file in accordance with a preferred embodiment of the present invention.

Referring next to FIG. 15, a flowchart of a process for writing data from a buffer to a file is depicted in accordance with a preferred embodiment of the present invention. The process begins by obtaining an index number for the type of file, as depicted in block 331. Then, an output file is opened, as illustrated in block 333. Parameters for the image request vector are set, as depicted in block 335. Next, data is written from the buffer to the output file using the image request vector, as depicted in block 337. After the data is written to the file, the output file is closed as illustrated in block 339.

Figure 16:
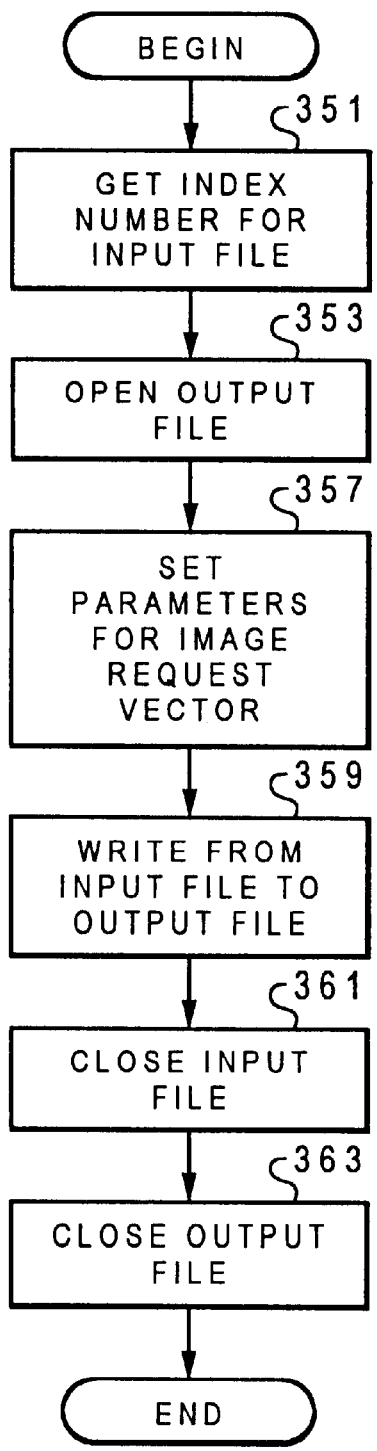
FIG. 16 is a process for writing an image stored in a first file into a second file in accordance with a preferred embodiment of the present invention.

Referring now to FIG. 16, a process for writing an image stored in a first file into a second file is illustrated according to the present invention. The process begins by obtaining an index number for the file containing the image, as illustrated in block 351. Then, an input file is opened, as depicted in block 353. Next, an output file is opened as illustrated in block 355. After the files are opened, parameters are set for the image request vector, as depicted in block 357. Thereafter, the image is written from the input file to the output file using an image request vector, as illustrated in block 359. The input file is then closed, as depicted in block 361. Thereafter, the output file also is closed, as illustrated in block 363.

Figure 17:
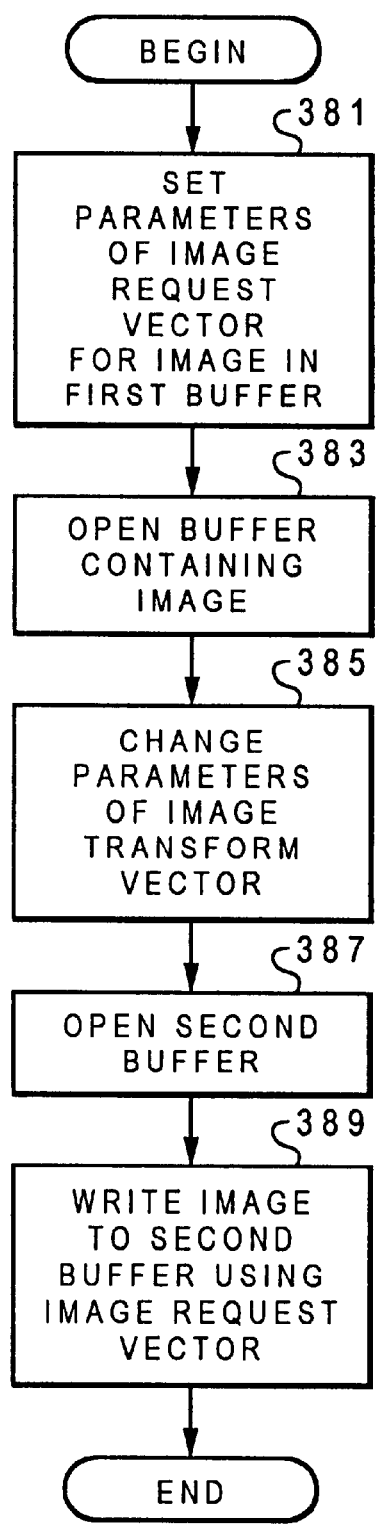
FIG. 17 depicts a process for reading data from one buffer to another buffer in accordance with a preferred embodiment of the present invention.

Referring now to FIG. 17, a process for reading data from one buffer to another buffer is illustrated in accordance with a preferred embodiment of the present invention. The process begins by setting the parameters of the image request vector to describe the image in the first buffer, as illustrated in block 381. The buffer containing the image is then opened as depicted in block 383. Parameters in the image transform vector are then changed as desired, as illustrated in block 385. Next, a second buffer is opened, as depicted in block 387. Then, the image is written from the first buffer into the second buffer using the image request vector, as illustrated in block 389.

The processes depicted in the figures may be implemented by those of ordinary skill in the art within the data processing system depicted in FIGS. 1 and 2. The processes of the present invention also may be implemented in a program storage device that is readable by a data processing system wherein the program storage device encodes data processing system executable instructions coding for the processes of the present invention. The program storage device may take various forms including, for example, but not limited to a hard disk drive, a floppy disk, an optical disk, a ROM, and an EPROM, which are known to those skilled in the art. The processes stored on a program storage device are dormant until activated by using the program storage device with the data processing system. For example, a hard drive containing data processing system executable instructions for the present invention may be connected to a data processing system; a floppy disk containing data processing system executable instructions for the present invention may be inserted into a floppy disk drive in the data processing system; or a ROM containing data processing system executable instructions for the present invention may be connected to the data processing system via a card or adapter connected to an I/O slot.

While the invention has been particularly shown and described with reference to a preferred embodiment, it will be understood by those skilled in the art that various changes in form and detail may be made therein without departing from the spirit and scope of the invention.

What is claimed is:

1. A method of transforming image data between formats, comprising:

receiving a request for image data in a requested format, the requested format including a plurality of parameters having a first set of parameter values including width, height, orientation, horizontal resolution, vertical resolution, bits per sample, and photometric;

identifying a present format for the image data, the present format including a second set of parameter values for the plurality of parameters;

comparing the second set of parameter values to the first set of parameter values;

responsive to identifying at least one parameter value within the second set which does not match a parameter value within the first set for a corresponding parameter, initializing a filter stack capable of containing an arbitrary number of selectively installed filters;

for each parameter value within the second set which does not match a corresponding parameter value within the first set, installing a filter in the filter stack for altering the image data; and applying each filter in the filter stack to the image data, wherein the image data may be efficiently transformed from the present format to the requested format.

2. The method of claim 1, wherein the step of applying each filter in the filter stack to the image data further comprises:

reading the image data into a buffer; and applying each filter in the filter stack to the image data in the buffer.

3. The method of claim 1, wherein the step of installing a filter in the filter stack further comprises:

installing a software filter selected from a filter library including a photometric filter, a rotate filter, a crop filter, a pad filter, a scale filter, a bit pad filter, a dither filter, a gray filter, a color transform filter, a decode filter, and an encode filter.

4. The method of claim 1, wherein the step of altering the image data further comprises:

installing within the filter stack only those filters altering a parameter of the image data corresponding to a parameter value within the second set which does not match a corresponding parameter value in the first set; and passing the image data through the filter stack.

5. The method of claim 1, wherein the step of creating a filter stack further comprises:

serially connecting a plurality of selected filters together, wherein a first of the plurality of selected filters provides an input for the filter stack and a last of the plurality of selected filters provides an output for the filter stack.

6. The method of claim 1, further comprising:

storing the altered image in a storage device.

7. The method of claim 1, further comprising:

sending the altered image to a printer.

8. A data processing system for transforming image data, comprising:

a storage device containing the image data;

a processor implementing an image transformer by:

receiving a request for the image data in a requested format describing an image with a first set of parameter values including width, height, orientation, horizontal resolution, bits per sample, and photometric;

identifying a present format of the image data, wherein the present format describes the image with a second set of parameter values;

comparing the first and second sets of parameter values to each parameter for which a parameter value within the first set does not match a corresponding parameter value within the second set;

if at least one parameter value within the first set does not match a corresponding parameter value within the second set, initializing a filter stack capable of containing an arbitrary number of selectively installed filters;

for each identified parameter having a parameter value within the first set which does not match a corresponding parameter value within the second set, selecting and installing a filter in the filter stack for altering the image data with respect to the identified parameter; and applying each selected filter installed in the filter stack to the image data.

9. The data processing system of claim 8, wherein the processor reads the image data into a buffer and applies each filter installed in the filter stack to the image data in the buffer.

10. The data processing system of claim 8, wherein filters installed in the filter stack are selected from a filter library including a photometric filter, a rotate filter, a crop filter, a pad filter, a scale filter, a bit pad filter, a dither filter, a gray filter, a color transform filter, a decode filter, and an encode filter.

11. The data processing system of claim 8, wherein the processor installs within the filter stack only those filters altering an identified parameter of the image data having a parameter value within the first set which does not match a corresponding parameter value within the second set.

12. The data processing system of claim 8, wherein the selected filters are serially connected together, wherein a first of the selected filters provides an input for the filter stack and a last of the plurality of selected filters provides an output for the filter stack.

13. The data processing system of claim 8, further comprising:

a storage device coupled to the processor receiving and storing the altered image.

14. The data processing system of claim 8, further comprising:

a printer coupled to the processor receiving the altered image.

15. A computer program product within a computer usable medium, comprising:

instructions for receiving a request for the image data in a requested format describing an image with a first set of parameter values;

instructions for identifying a present format of the image data, wherein the present format describes the image with a second set of parameter values;

instructions for comparing the first and second sets of parameter values to each parameter for which a parameter value within the first set does not match a corresponding parameter value within the second set;

instructions, if at least one parameter value within the first set does not match a corresponding parameter value within the second set, for initializing a filter stack capable of containing an arbitrary number of selectively installed filters;

instructions, for each identified parameter having a parameter value within the first set which does not match a corresponding parameter value within the second set, for selecting and installing a filter in the filter stack for altering the image data with respect to the identified parameter, wherein said filter is selected from a filter library including a photometric filter, a rotate filter, a crop filter, a pad filter, a scale filter, a bit pad filter, a dither filter, a gray filter, a color transform filter, a decode filter, and an encode filter; and instructions for applying each selected filter installed in the filter stack to the image data.

16. The computer program product of claim 15, wherein the instructions for selecting and installing a filter in the filter stack for altering the image data with respect to the identified parameter further comprise:

instructions for installing within the filter stack only those filters altering an identified parameter of the image data having a parameter value within the first set which does not match a corresponding parameter value within the second set.

17. The computer program product of claim 15, further comprising:

instructions for serially connecting the selected filters are serially installed in the filter stack;

instructions for specifying a first of the selected filters as an input for the filter stack; and instructions for specifying a last of the selected filters as an output for the filter stack.

* * * * *